(12) United States Patent
Guilloux et al.

(10) Patent No.: US 12,507,300 B2
(45) Date of Patent: Dec. 23, 2025

(54) BLUETOOTH COMMUNICATION METHOD AND SYSTEM

(71) Applicants: EM Microelectronic-Marin SA, Marin (CH); ROBERT BOSCH GMBH, Stuttgart (DE)

(72) Inventors: Julian Guilloux, Colombier (CH); Stéphanie Salgado, La Neuveville (CH); Marcel Ruecker, Stuttgart (DE); Joachim Nagel, Reutlingen (DE); Yann Ravier, Tübingen (DE)

(73) Assignees: EM Microelectronic-Marin SA, Marin (CH); ROBERT BOSCH GMBH, Stuttgart (DE)

( * ) Notice: Subject to any disclaimer, the term of this patent is extended or adjusted under 35 U.S.C. 154(b) by 457 days.

(21) Appl. No.: 18/156,033

(22) Filed: Jan. 18, 2023

(65) Prior Publication Data

US 2023/0239945 A1    Jul. 27, 2023

Related U.S. Application Data

(60) Provisional application No. 63/302,744, filed on Jan. 25, 2022.

(30) Foreign Application Priority Data

Jul. 14, 2022  (EP) .................................. 22185009
Jul. 14, 2022  (EP) .................................. 22185010

(51) Int. Cl.
*H04W 4/00* (2018.01)
*H04L 1/1607* (2023.01)
*H04L 5/00* (2006.01)
*H04L 9/08* (2006.01)
*H04W 12/033* (2021.01)
*H04W 12/50* (2021.01)
*H04W 72/0453* (2023.01)
*H04W 76/15* (2018.01)

(52) U.S. Cl.
CPC .......... *H04W 76/15* (2018.02); *H04L 1/1642* (2013.01); *H04L 5/0048* (2013.01); *H04L 9/0838* (2013.01); *H04L 9/0861* (2013.01); *H04W 12/033* (2021.01); *H04W 12/50* (2021.01); *H04W 72/0453* (2013.01)

(58) Field of Classification Search
CPC ... H04W 76/15; H04W 8/00; H04W 72/0453; H04L 1/1642; H04L 5/0048
USPC ........................................................ 370/329
See application file for complete search history.

(56) References Cited

U.S. PATENT DOCUMENTS

| | | | |
|---|---|---|---|
| 10,149,114 B2 * | 12/2018 | Daoud | H04W 40/20 |
| 10,171,646 B2 * | 1/2019 | Daoud | H04W 4/40 |
| 10,330,784 B2 * | 6/2019 | Cavendish | H04W 84/12 |
| 10,645,559 B2 * | 5/2020 | Li | H04W 12/50 |
| 10,999,260 B1 * | 5/2021 | Silvestri | H04L 9/0894 |

(Continued)

*Primary Examiner* — Marceau Milord
(74) *Attorney, Agent, or Firm* — Sughrue Mion, PLLC

(57) ABSTRACT

A Bluetooth communication method implemented between first and second electronic devices, including establishing a communication in a connected mode between the first and second devices including a key exchange operation between these two devices, and establishing a communication in an advertising mode between the first and second devices including a periodic broadcast by the second device to the first device of a message including a payload and a calculated tag from this key.

16 Claims, 13 Drawing Sheets

(56) References Cited

U.S. PATENT DOCUMENTS

| | | | | |
|---|---|---|---|---|
| 11,082,809 B1* | 8/2021 | Burowski | H04W 8/005 |
| 11,240,671 B1* | 2/2022 | Huang | H04W 76/14 |
| 11,632,665 B2* | 4/2023 | Paladugu | H04W 12/63 |
| | | | 370/329 |
| 11,647,111 B2* | 5/2023 | Cheong | H04M 1/72403 |
| | | | 455/566 |
| 11,671,804 B2* | 6/2023 | Cheong | H04W 4/80 |
| | | | 455/41.2 |
| 11,683,850 B2* | 6/2023 | Hsiao | H04B 1/7156 |
| | | | 455/41.2 |
| 11,700,653 B2* | 7/2023 | Batta | H04R 5/033 |
| | | | 370/329 |
| 11,723,092 B2* | 8/2023 | Hughes | H04W 48/18 |
| | | | 370/329 |
| 11,743,736 B2* | 8/2023 | Sarma | H04W 4/80 |
| | | | 370/329 |
| 11,812,262 B2* | 11/2023 | Chandarana | H04W 4/80 |
| 11,812,266 B2* | 11/2023 | Adel | H04L 67/306 |
| 11,856,623 B2* | 12/2023 | Paladugu | H04L 5/0048 |
| 11,856,625 B2* | 12/2023 | Tenny | H04W 76/14 |
| 11,863,992 B2* | 1/2024 | Motos | H04L 9/001 |
| 12,160,912 B2* | 12/2024 | Huang | H04L 5/0048 |
| 2013/0198518 A1* | 8/2013 | Ran | H04L 63/08 |
| | | | 713/170 |
| 2015/0382304 A1* | 12/2015 | Park | H04W 56/001 |
| | | | 455/41.2 |
| 2018/0077124 A1* | 3/2018 | Ramoutar | H04L 9/0891 |
| 2018/0292522 A1* | 10/2018 | Cavendish | H04W 12/06 |
| 2019/0253857 A1* | 8/2019 | Li | H04W 4/80 |
| 2020/0059784 A1* | 2/2020 | Batra | H04L 9/3271 |
| 2020/0220713 A1* | 7/2020 | Li | H04L 9/14 |
| 2020/0332799 A1* | 10/2020 | Schnurr | F04B 39/0061 |
| 2021/0037582 A1* | 2/2021 | Kim | H04W 12/55 |
| 2021/0051458 A1* | 2/2021 | Cheong | H04W 48/16 |
| 2021/0297255 A1* | 9/2021 | Wan | H04L 63/0442 |
| 2022/0124491 A1* | 4/2022 | Yung | H04L 9/0838 |
| 2022/0304094 A1* | 9/2022 | Hsiao | H04W 8/00 |
| 2022/0337986 A1* | 10/2022 | Cheong | H04W 76/15 |
| 2022/0369113 A1* | 11/2022 | Motos | H04L 9/001 |
| 2022/0394490 A1* | 12/2022 | Sarma | H04W 4/80 |
| 2023/0164560 A1* | 5/2023 | Wang | H04W 12/50 |
| | | | 455/411 |

* cited by examiner

Fig. 8
Bluetooth – Integrity & authenticity protection in advertising mode
Phase 1: Setup. Key agreement over direct communication.
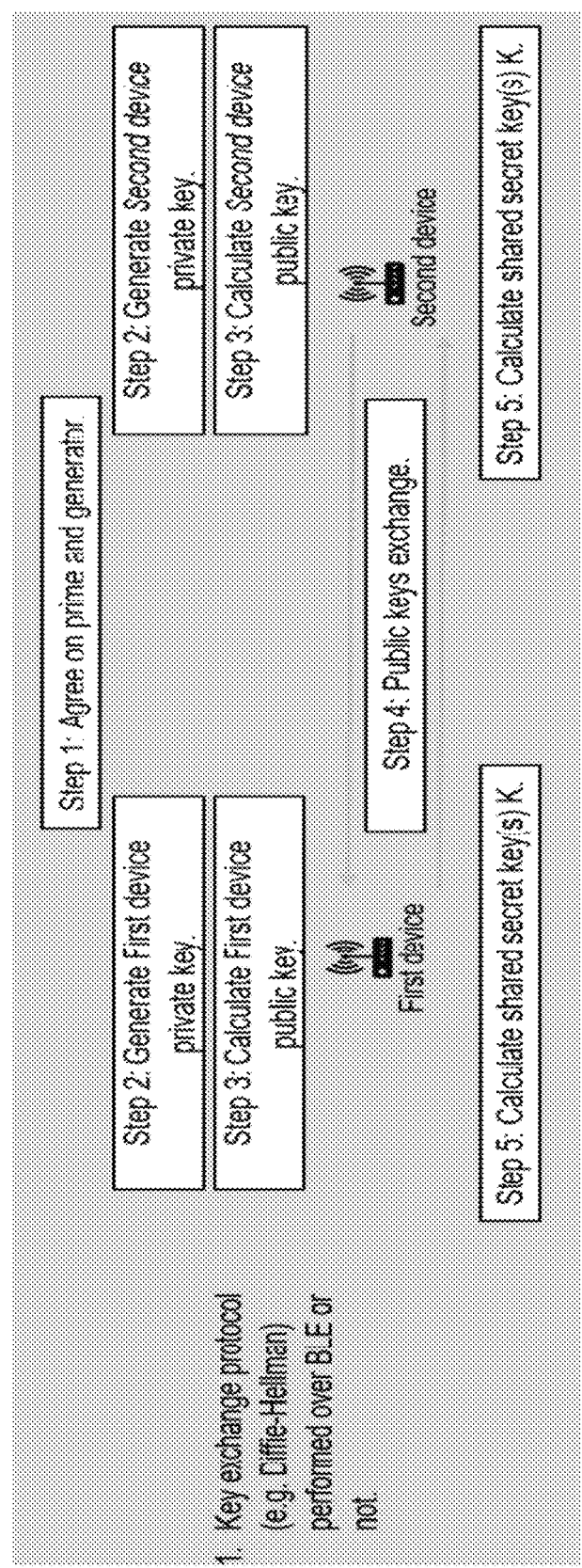

Fig. 12

Bluetooth – Protection against replay attack in advertising mode
Phase 1: Setup Same as "Bluetooth – Integrity and authenticity protection in advertising mode" with the addition of the counter.

The example is based on a Second device communicating directly with First device over BLE, with key distribution and with the use of a counter as Sequence number.

Symbol:  Counter

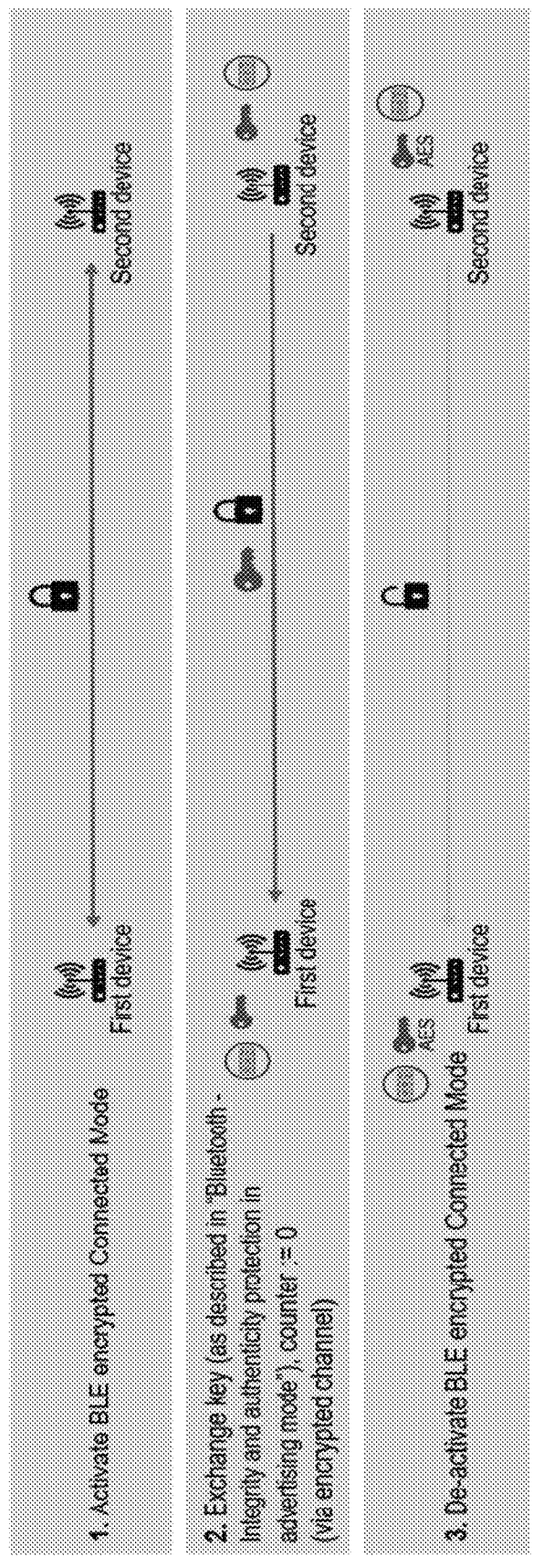

BLUETOOTH COMMUNICATION METHOD AND SYSTEM

CROSS REFERENCE TO RELATED APPLICATIONS

This application claims priority to U.S. Provisional Application No. 63/302,744, filed Jan. 25, 2022, European Patent Application No. 22185009.2, filed Jul. 14, 2022, and European Patent Application No. 22185010.0, filed Jul. 14, 2022, the entire contents of which are incorporated herein by reference.

FIELD OF THE INVENTION

Various embodiments of the present invention relates to a Bluetooth™ communication method and system implemented between first and second electronic devices. The first device, which can be for example an Electronic Control Unit, a Computer, a controller, a processing unit, a Smartphone, is able to process messages provided by the second device. The second device, which can be for example a tiny embedded device such as a sensor, is able to transmit these messages comprising useful data or payload, to the first device only in an advertising mode of the Bluetooth protocol. These messages comprise for example measurement information relating to a quantification of attributes of an object or event such as for example a pressure of a tire or the heart rate of an individual.

BACKGROUND OF THE INVENTION

In the related art, it is known that a communication ensuring integrity and authenticity between two devices using Bluetooth Low Energy (BLE) or Bluetooth Classic (BT Classic) requires currently a secure connected mode with MIC acronym for Message Integrity Code and which is specific to BLE/BT Classic. It can be noted that Generic word for MIC is also called MAC (acronym for Message Authentication Code).

However, one of the drawbacks of such connected mode is that it has a high power consumption making it unsuitable for the tiny embedded devices requiring a very low power consumption. Information security, principally integrity and authenticity, and energy consumption are particularly two topics becoming of paramount importance for the development of the Internet of Things.

SUMMARY OF THE INVENTION

In this context, embodiments of the present disclosure provide a Bluetooth communication method and system implemented between first and second devices, to ensure integrity, authenticity and/or confidentiality of messages sent using the Bluetooth communication protocol mainly or only in advertising mode.

Furthermore, embodiments of the present disclosure provide a full protection against replay attack in advertising mode.

To this end, embodiments of the present disclosure include a Bluetooth communication method implemented between first and second electronic devices, the method comprising:
establishing a communication in a connected mode between the first and second devices comprising a key exchange operation between these two devices, and
establishing a communication in an advertising mode between these first and second devices comprising a periodic broadcast by the second device to the first device of a message comprising a payload and a calculated tag from this key.

Embodiments of the present disclosure also include a Bluetooth communication method implemented between first and second electronic devices, the method comprising:
distributing by a third party tool, a key through a secure wired or wireless communication channel to the first and second devices, and
establishing a communication in an advertising mode between these first and second devices comprising a periodic broadcast by the second device to the first device of a message comprising a payload and a calculated tag from this key.

In other embodiments:
the message comprises a sequence number which is updated for each message broadcasted by the second device to the first device;
the message is encrypted from the key;
the calculated tag is obtained by using the key to calculate a Message Authentication Code or to calculate a signature of the payload to be advertised;
the key is a shared secret key stored in the memory of the first and second devices;
the key is a shared secret key stored in the memory of the third party tool.

Embodiments of the present disclosure also include a Bluetooth communication system implemented between first and second devices, the system comprising these first and second devices and configured to:
establish a communication in a connected mode between the first and second devices comprising a key exchange operation between these two devices, and
establish a communication in an advertising mode between these first and second devices comprising a periodic broadcast by the second device to the first device of a message comprising a payload and a calculated tag from this key.

Embodiments of the present disclosure also include a Bluetooth communication system implemented between first and second devices, the system comprising these first and second devices and a third party tool, the system being configured to:
distribute by the third party tool, a key through a secure wired or wireless communication channel to the first and second devices, and
establish a communication in an advertising mode between these first and second devices comprising a periodic broadcast by the second device to the first device of a message comprising a payload and a calculated tag from this key.

BRIEF DESCRIPTION OF THE DRAWINGS

The present invention will be described subsequently in more detail with reference to the attached drawing, given by way of examples, but in no way limited thereto, in which.

FIG. 8 is a schematic diagram of a key agreement between the first and second devices implemented in the Bluetooth communication method according to the first embodiment of the present invention;

FIGS. 12 and 13 are schematic diagrams of of the Bluetooth communication method according to the fifth embodiment of the present invention.

DETAILED DESCRIPTION OF THE INVENTION

In the different embodiments of the invention illustrated in FIGS. 1 to 4 and 8 to 11, the Bluetooth communication method implemented between first and second devices, allows these devices to advertise messages with integrity and authenticity protection. To achieve this, the messages exchange between these two devices, is either signed or a Message Authentication Code (MAC) is calculated. In this context, the necessary key information to verify the signature or the MAC, which can be the already available BLE keys (e.g. Identity Resolving Key, Long-Term Key, Connection Signature Resolving Key), must be exchanged at least once between the first and second devices. In this way, the method comprises an activation of a "Connected Mode" for implementing a key exchange. In an alternative, the key exchange can happen over other communication channels, such as Out of Band or the use of a third party tool or a cable connection (see FIG. 4).

Figure 1:
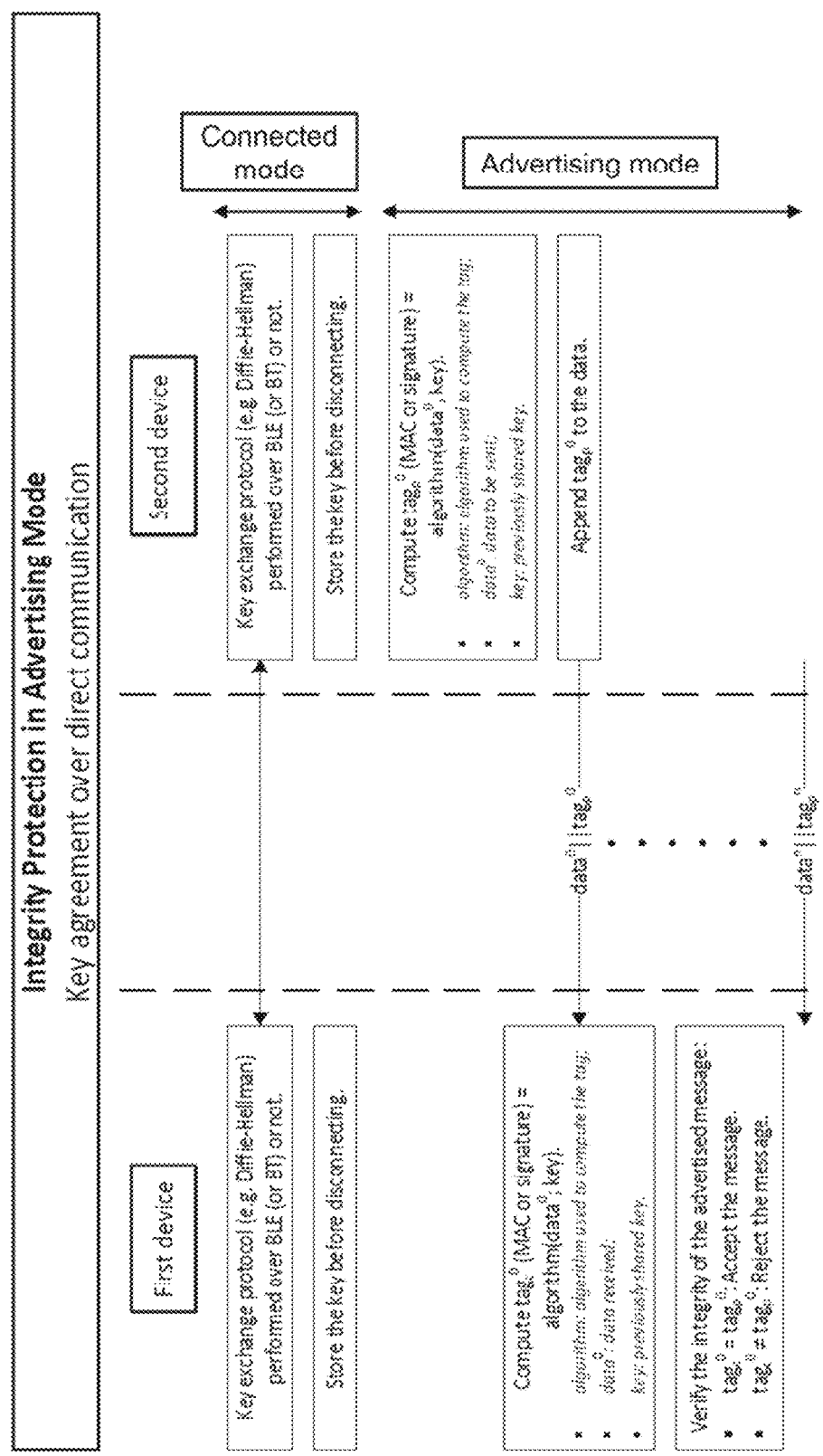
FIG. 1 is a schematic diagram of a Bluetooth communication method implemented between first and second devices according to a first embodiment of the present invention.
Figure 2:
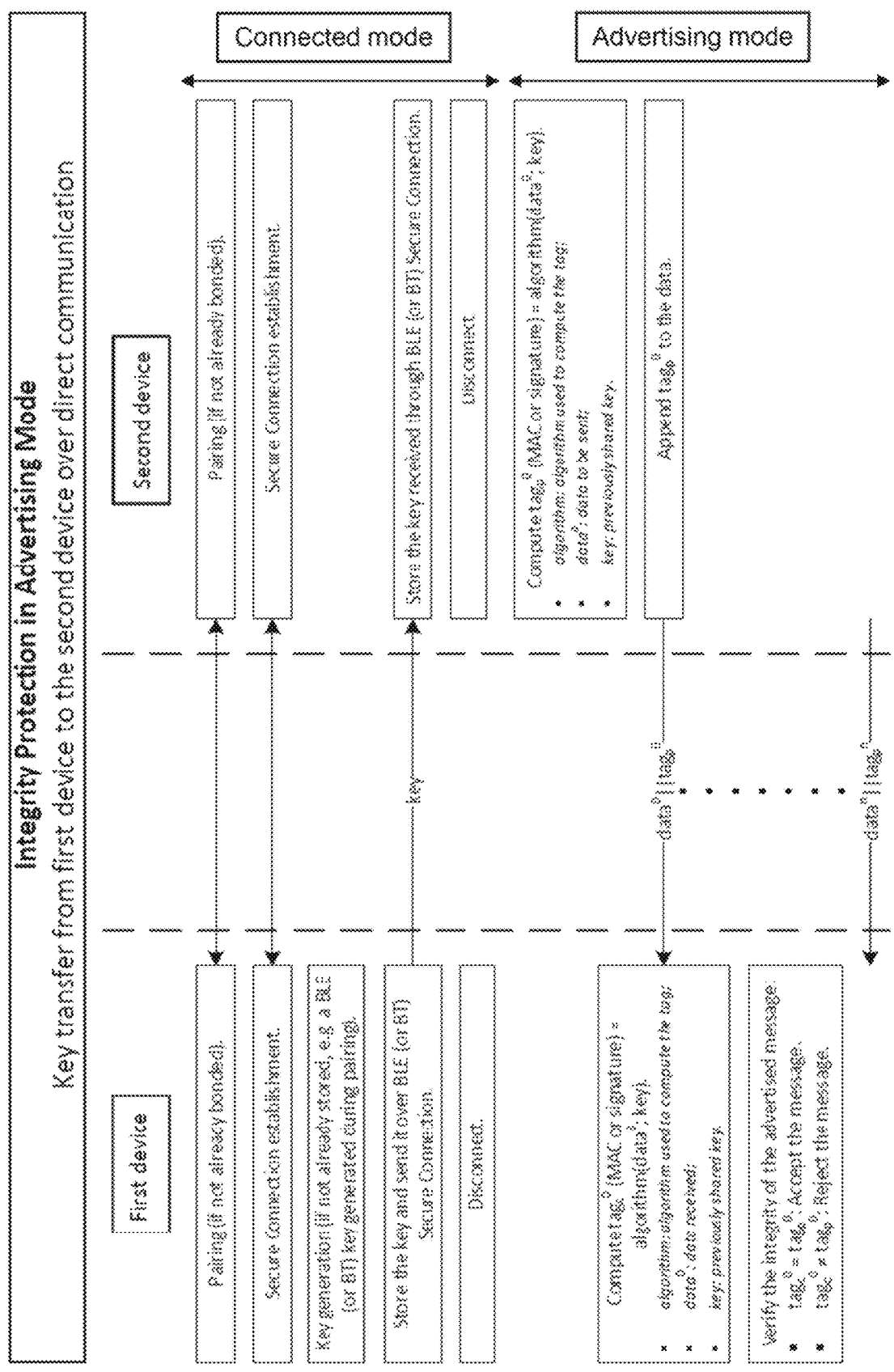
FIG. 2 is a schematic diagram of a Bluetooth communication method implemented between first and second devices according to a second embodiment of the present invention.
Figure 3:
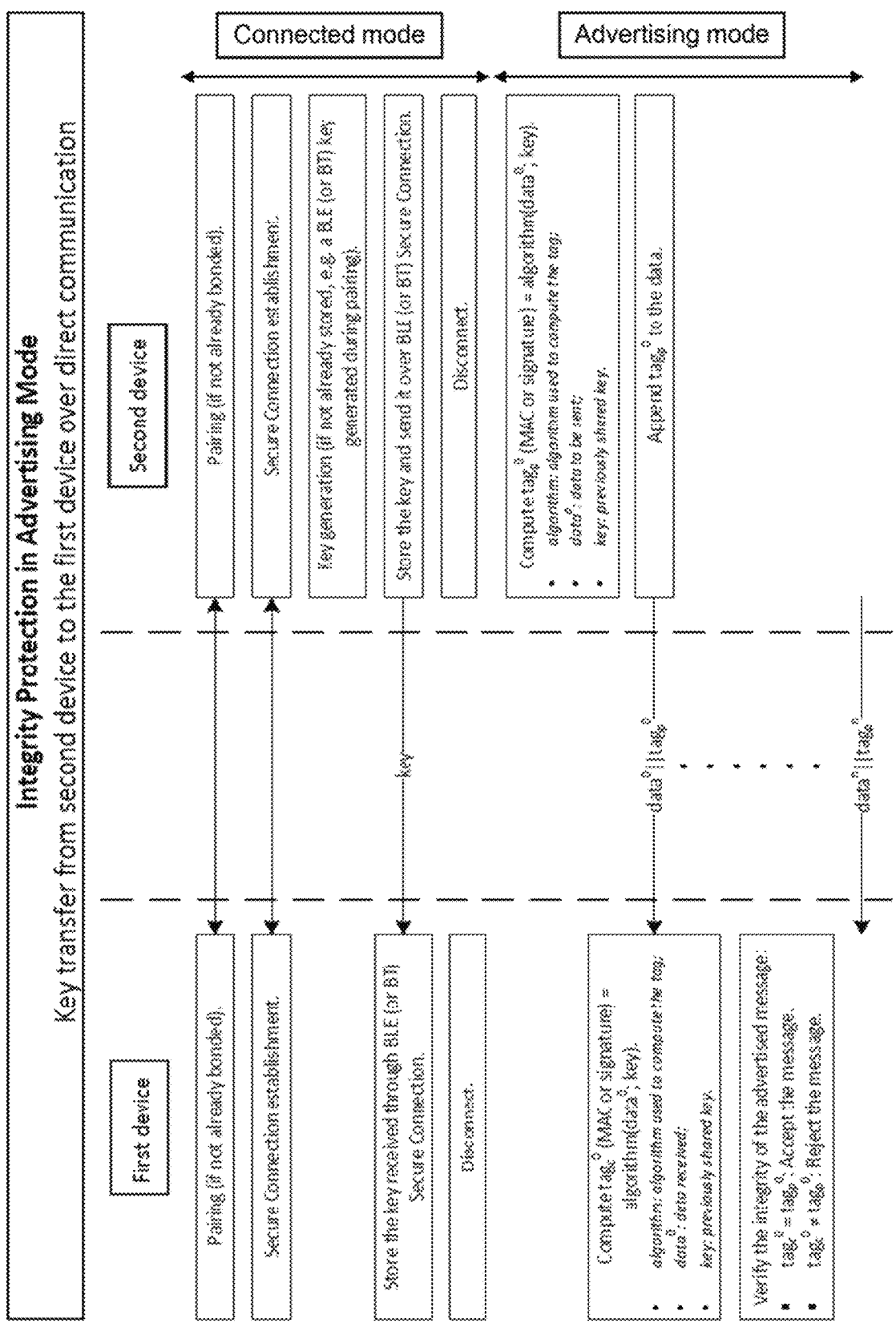
FIG. 3 is a schematic diagram of a Bluetooth communication method implemented between first and second devices according to a third embodiment of the present invention.

In this method, the key information is exchanged between the first and second device. In this context, as illustrated in FIGS. 1 to 3, the communication for the key information can be a direct communication such as pairing or an additional, not BLE, encrypted (or not, in case of key agreement) channel. In case of direct transmission, that is over BLE or BT Classic connected mode (Encrypted channel for key exchange or unencrypted channel for key agreement): after the key information are exchanged, it is no longer necessary for the second device to connect again with the first device, as long as the key stays valid. That means that the second device requires to connect once per key with the first device and then only advertising is necessary.

Figure 4:
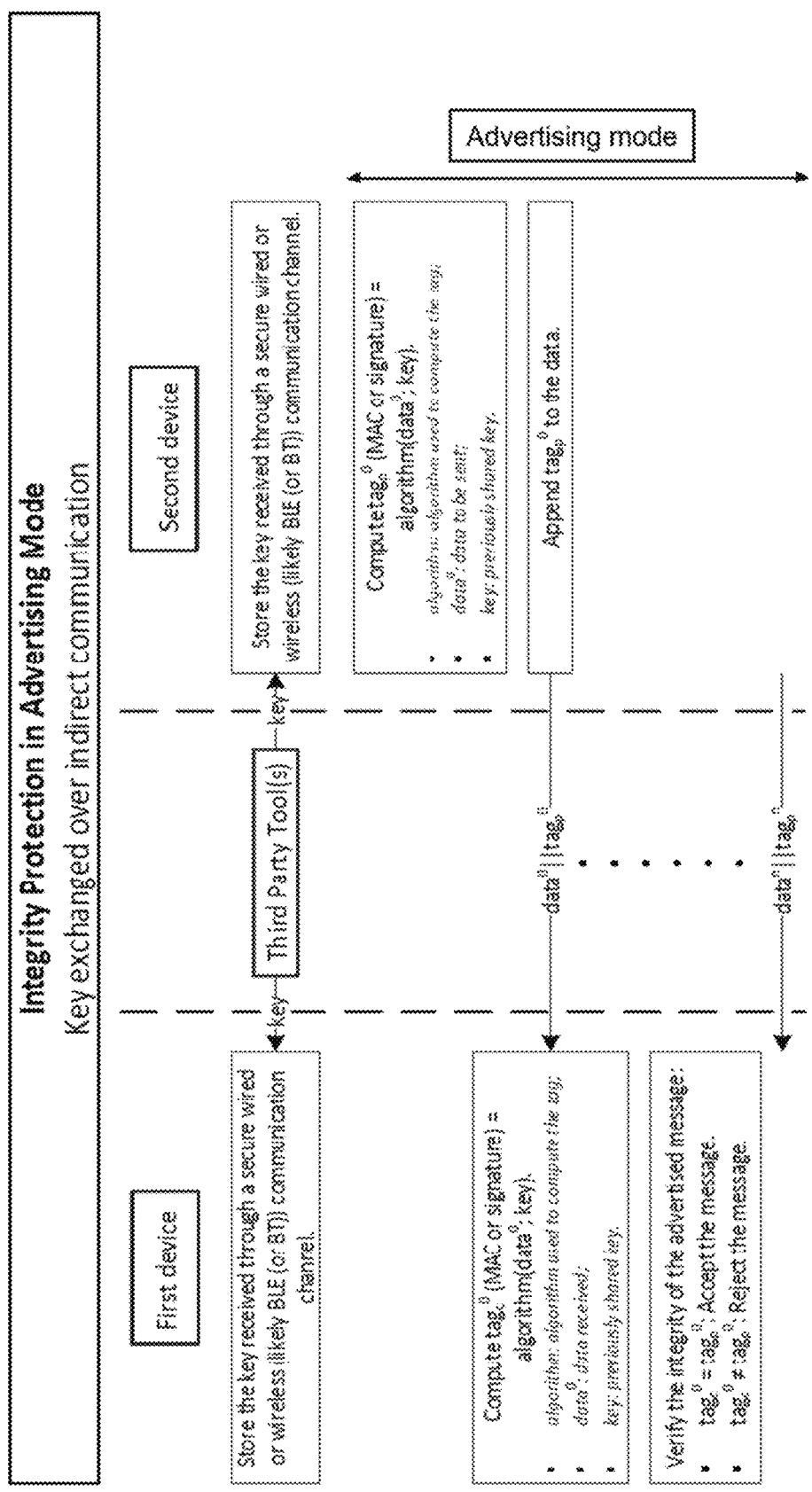
FIG. 4 is a schematic diagram of a Bluetooth communication method implemented between first and second devices according to a fourth embodiment of the present invention.

As illustrated in FIG. 4, the communication for the key information can be an indirect communication. Indeed a third party tool can be used during the implementation of the key exchange. For example when the second device is a TPMS sensor, the first device can be an Electronic Control Unit of a car and this third party tool a TPMS programming device.

In this method, the key information can be agreed on in the following ways:
- a key agreement by using cryptographic algorithms such as Diffie-Hellman for example;
- a key distribution from second device to first device (or contrary). The key can be generated within the BLE/BT Classic core specification (e.g. use or derivation of the LTK, IRK, CSRK, DH SK) or outside of the BLE/BT Classic core specification.

Furthermore, the method comprises the use of the key to calculate a MAC (Message Authentication Code. E.g., AES-CMAC, HMAC) or a signature (e.g. ECDSA) of the payload to be advertised. The calculated tag (MAC or signature) is added to the payload and the payload with the tag is advertised. The payload integrity and authenticity is verified by the receiving device.

As previously specified, these methods of the first to the fourth embodiments ensure integrity and authenticity of the messages against malicious changes for messages advertised over BLE/BT Classic, which is up to now not possible. Moreover they optimize the use of the unilateral communication against bilateral.

In addition, it should be noted that these methods offer many advantages, including the following:
- achieved level of protection in advertising for message integrity and authenticity similar to the level achievable with Bluetooth "connected mode".
- very low power consumption in comparison with a signed permanent connected mode. This allows to solve the dilemma of having to choose between low power consumption to get a high battery (and often product) lifetime and security (integrity and authenticity) of communication.
- more ecological products through a longer product lifetime thanks to a dramatically reduced power consumption in comparison with a signed permanent connected mode.
- lower complexity of the product thanks to the possibility to ensure integrity against malicious changes without a signed permanent connected mode for most or all of the communications.
- low additional effort on both side (receiver and transmitter) thanks to the possibility to reuse already implemented features (such as BLE connected mode).

These methods can be implemented in any BLE or BT Classic communication requiring integrity against malicious attacks of the communication but, for most of the time (or the whole time), not necessitating of a bidirectional communication. For example, these methods can be implemented in all of the following technical fields:
- automotive (like passenger cars, commercial vehicles, trucks), two-wheelers (like motorbike, bicycle, e-bike, scooter application), three-wheelers (like TucTuc): Tire Pressure Monitoring Sensor (TPMS) advertising over BLE; e-call communicating over BLE with a smartphone; presence detectors (e.g. in baby-seats) communicating over BLE with a smartphone; e-bike sensors and devices communicating over BLE with a receiver.

medical: Communication of portable medical devices such as pacemakers and hearing devices communicating their data to a receiver over Bluetooth.

agriculture: Sensors in fields communicating their data to a gateway over Bluetooth.

industry: Sensors integrated in the production tools communicating their data over Bluetooth to a gateway; Assets tracking;

consumer market: Numerous applications for Bluetooth communication between smartphones, tablets, laptops and wearables, hearables, gaming toys In order to spare more energy, these methods can implement scan request/scan response instead of each advertisement.

Figure 5:
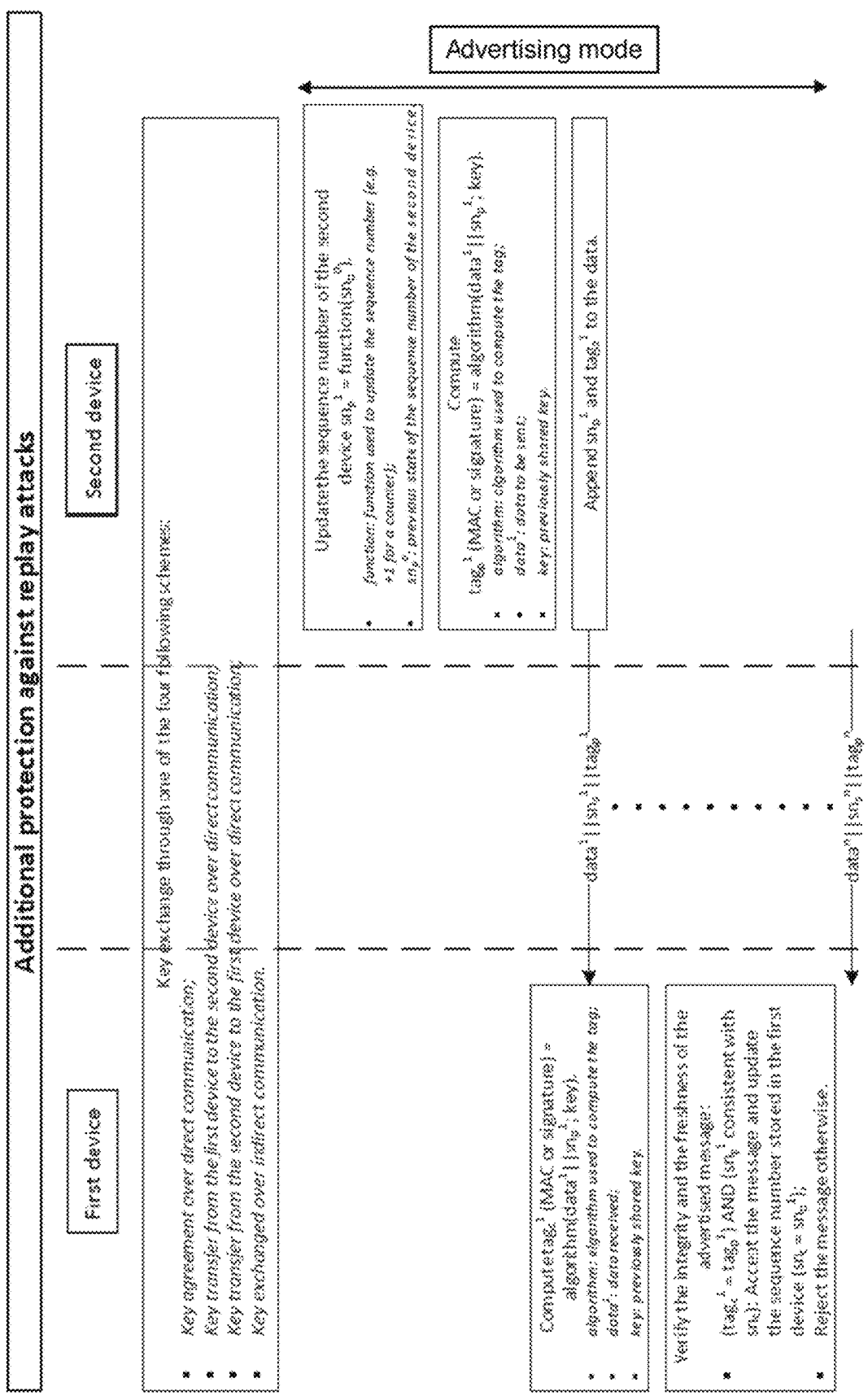
FIG. 5 is a schematic diagram of a Bluetooth communication method implemented between first and second devices according to a fifth embodiment of the present invention.
Figure 13:
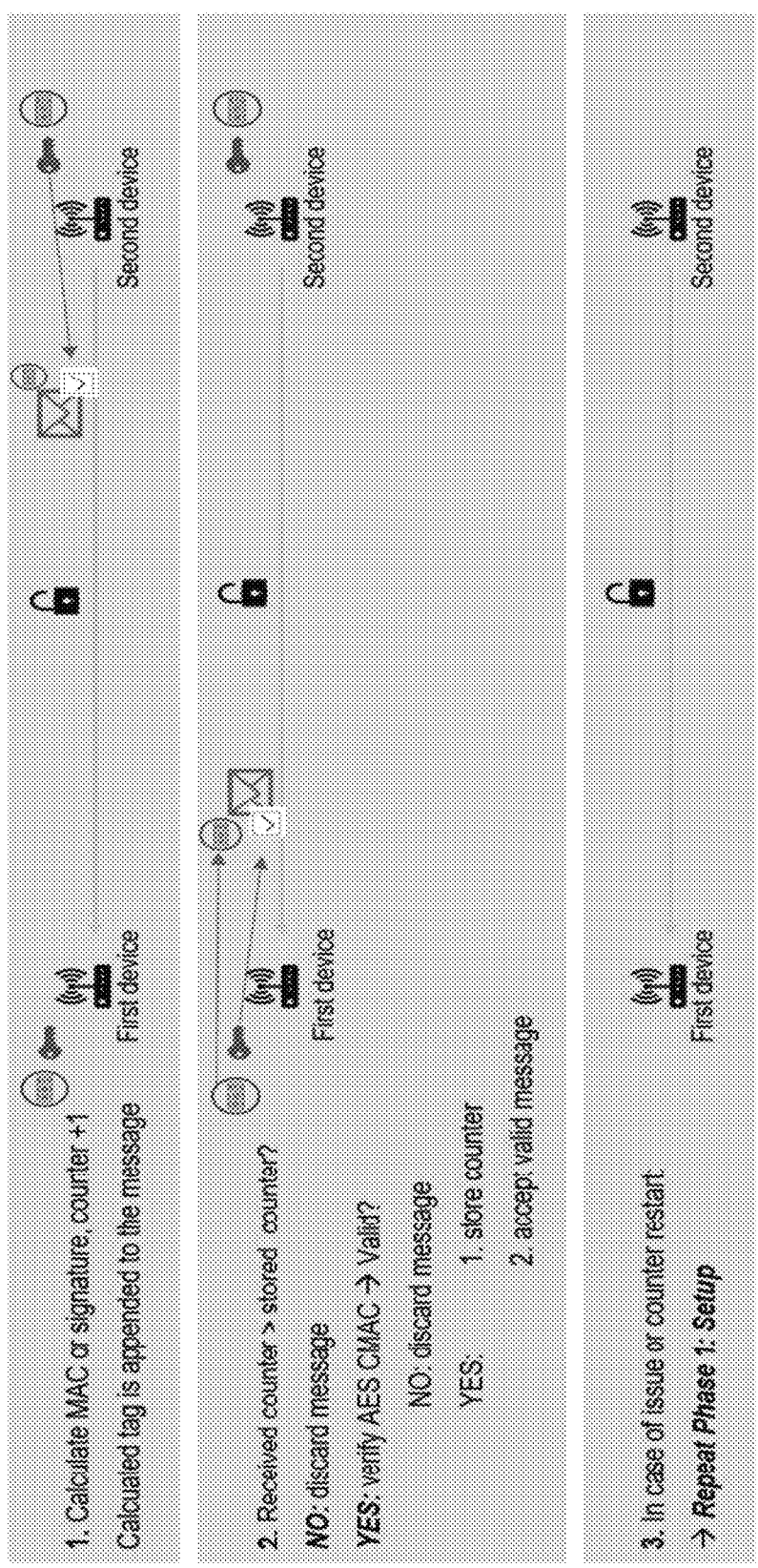

In reference to FIGS. 5, 12 and 13, the fifth embodiment concerns a Bluetooth communication method using Bluetooth Low Energy (BLE) or Bluetooth Classic that ensures a full protection against replay attack in advertising mode. The exponential diffusion of sensors embedded in all kind of portable devices as well as the use of BLE/Bluetooth Classic communication in critical applications make the protection against replay attack of utmost importance.

In this fifth embodiment, the method allows devices to advertise messages with protection against replay attack, in addition to integrity and authenticity protection. To achieve this, a sequence number, such as a counter for example, is used in addition to the previously described message signature or MAC. The receiver (e.g.: the first or the second device) will verify the consistency of the sequence number to ensure the freshness of the message. In case the counter needs to restart, for example because it has come to the end, the key used for the integrity check will be changed. In this way, the reuse of a previous message will be immediately recognized as invalid by the receiver.

It must be understood that the particularity of the method according to this fifth embodiment, is the addition of a sequence number (such as, for example, a counter) to the methods of the first, second, third and fourth embodiments. This allows devices using the Bluetooth communication protocol in advertising mode to communicate together and having these features implemented to ensure the freshness of the advertised messages. In that way, full protection against replay attack can be guaranteed.

This method of the fifth embodiment is similar to the methods of the first to fourth embodiments, except that it comprises the addition of the sequence number (such as a counter or a time stamp) to the payload. The dimensions of the sequence number is free. In this context, the receiver (e.g.: the first or second device) verifies the consistency of the sequence number. This key is changed each time the sequence number restart. It can be understood that this feature ensures that each message can be used only once.

As previously specified, the method of this fifth embodiment ensures integrity and authenticity of the messages against malicious changes for messages advertised over BLE/BT Classic, which is up to now not possible. Moreover it optimizes the use of the unilateral communication against bilateral.

In addition, it should be noted that this method offers many advantages, including the following:

full protection against replay attack in advertising mode;

very low power consumption in comparison with a permanent connected mode protected against replay attack;

more ecological products through a longer product lifetime thanks to a dramatically reduced power consumption in comparison with a permanent connected mode (in which a similar concept needs to be implemented);

lower complexity of the product thanks to the possibility to ensure protection against replay attack without using a permanent connected mode for most or all of the communications;

low additional effort on both side (receiver and transmitter) thanks to the possibility to reuse already implemented features (such as BLE connected mode).

Figure 6:
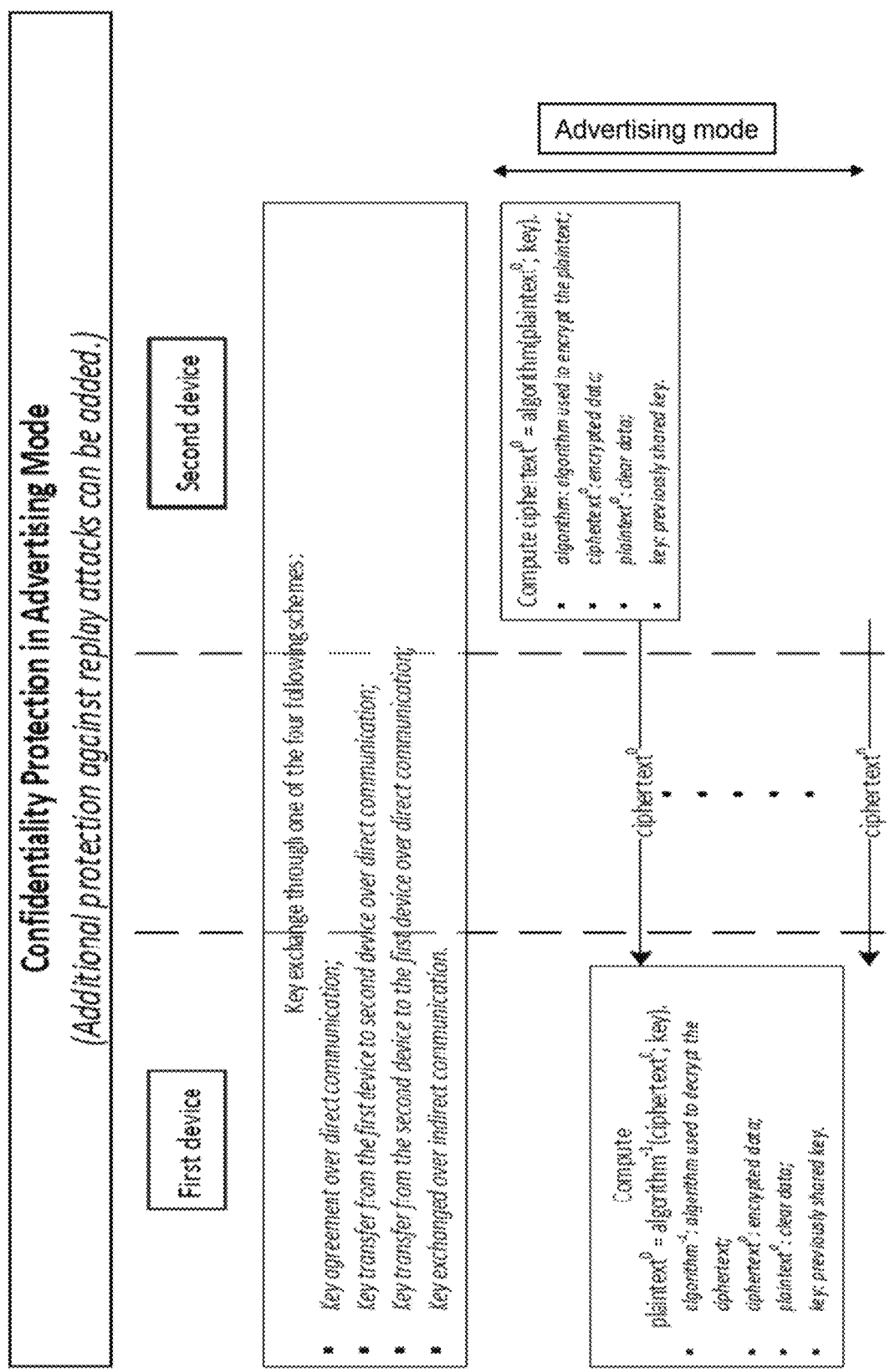
FIG. 6 is a schematic diagram of a Bluetooth communication method implemented between first and second devices according to a sixth embodiment of the present invention.
Figure 7:
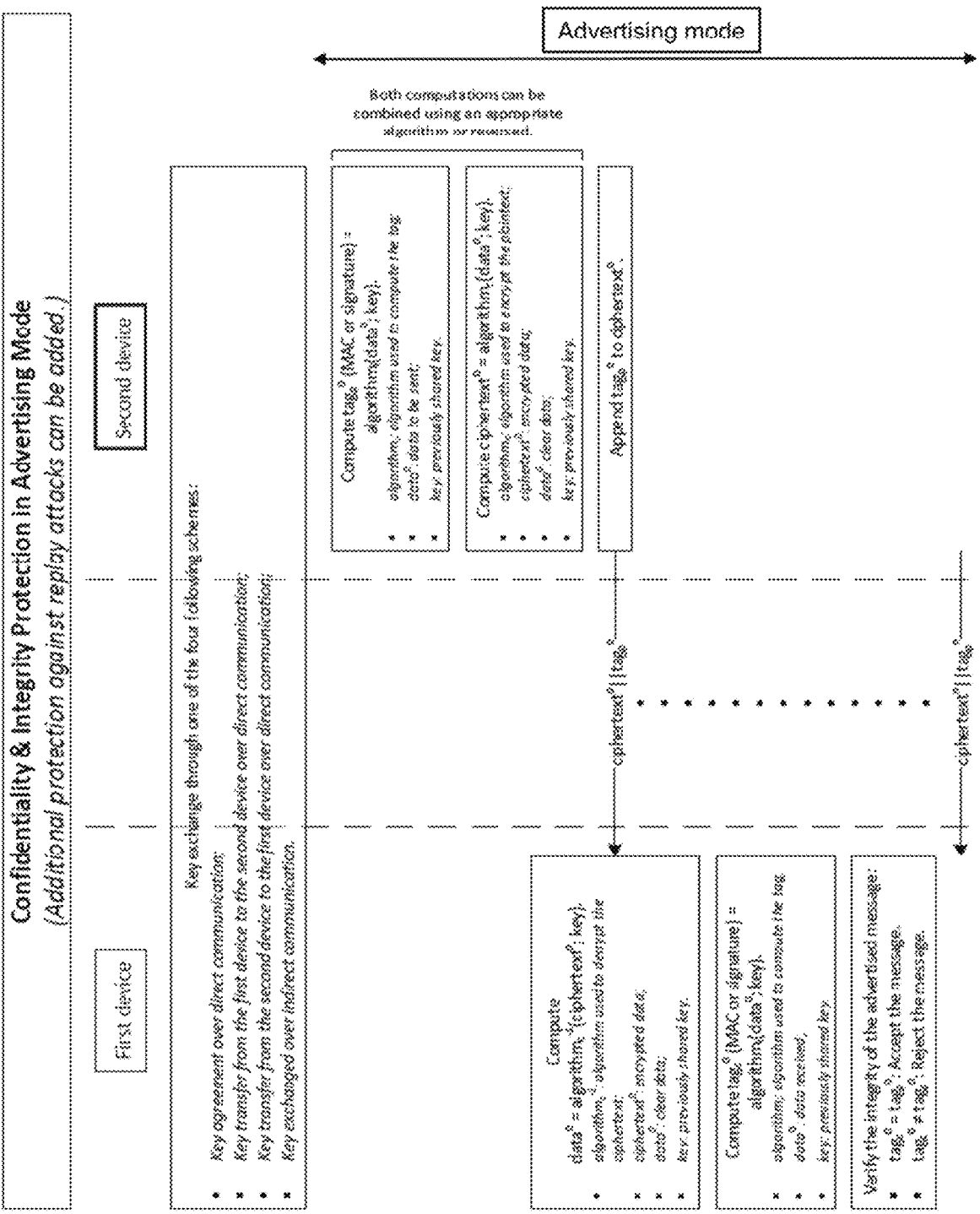
FIG. 7 is a schematic diagram of a Bluetooth communication method implemented between first and second devices according to a seventh embodiment of the present invention.
Figure 9:
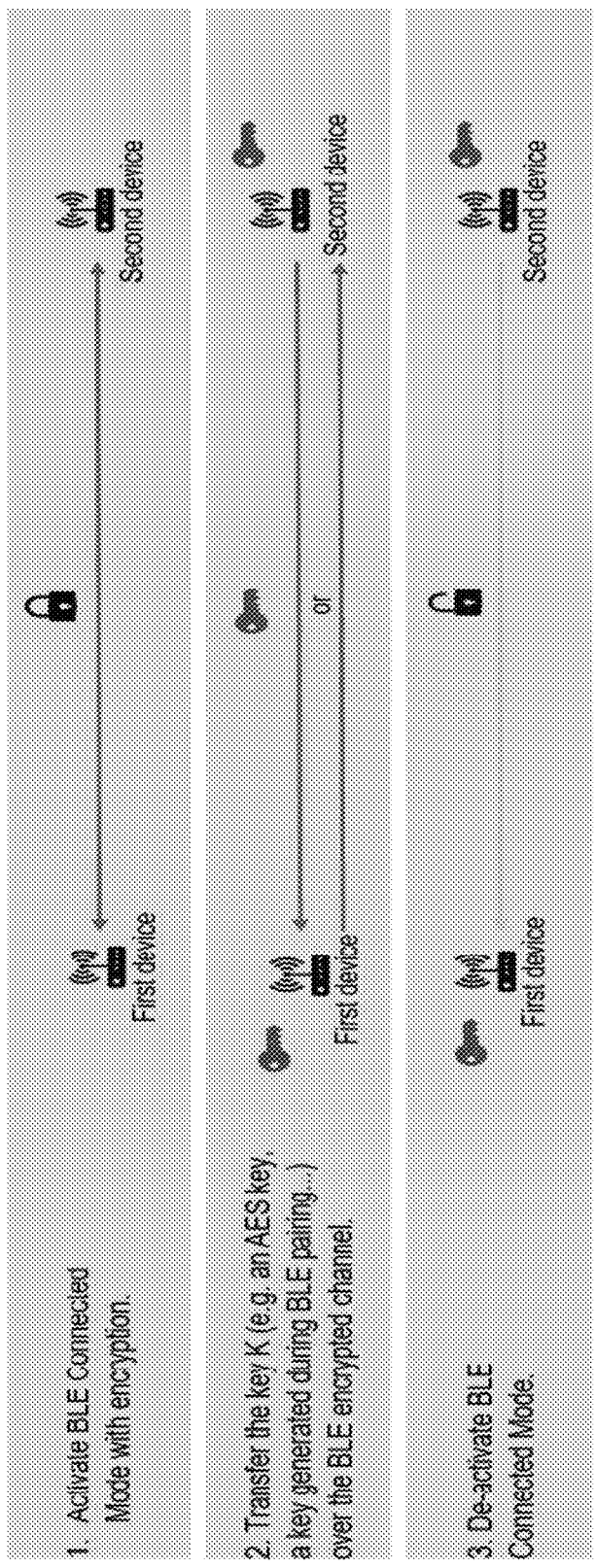
FIG. 9 is a schematic diagram of a key transfer between the first and second devices implemented in the Bluetooth communication method according to the second and third embodiments of the present invention.
Figure 10:
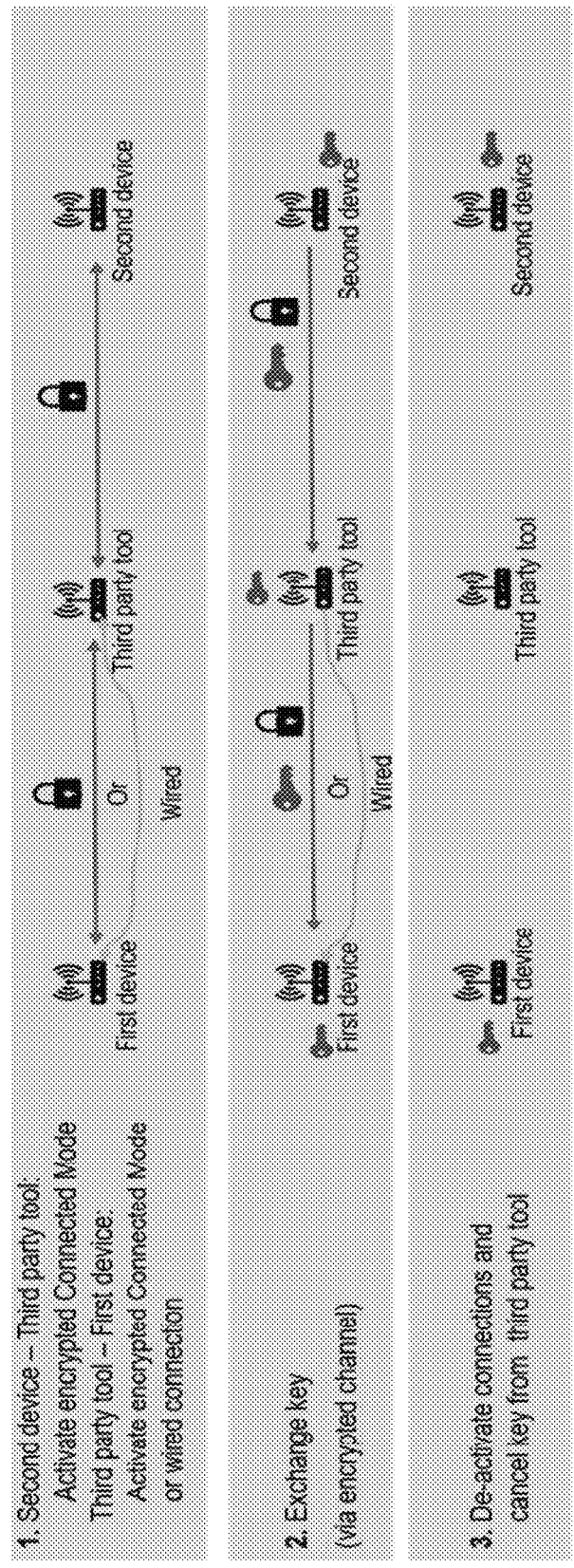
FIG. 10 is a schematic diagram of a key exchanged between the first and second devices implemented in the Bluetooth communication method according to the fourth embodiment of the present invention.
Figure 11:
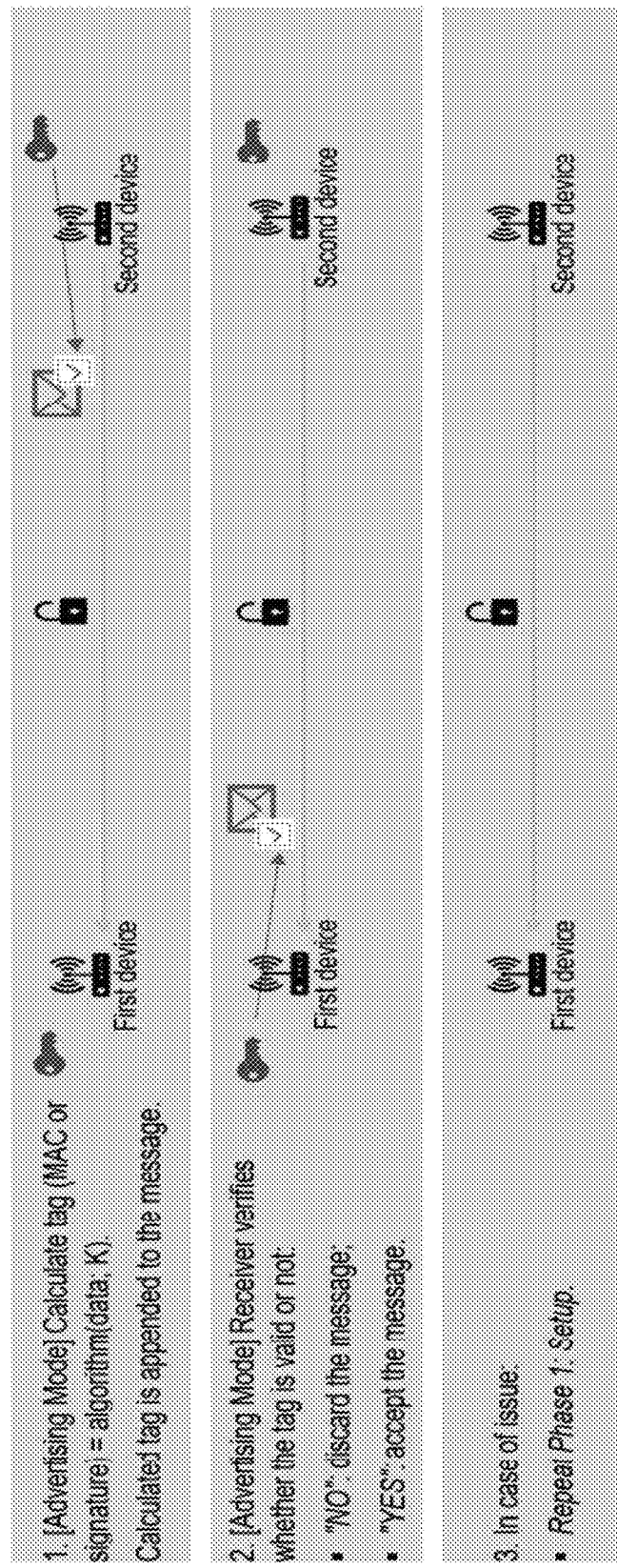
FIG. 11 is a schematic diagram of an exchange of a between the first and second devices in a advertising mode implemented in the Bluetooth communication method according to the first to fourth embodiments of the present invention.

This method can be implemented in any BLE or BT Classic communication requiring protection against replay attack but, for most of the time (or the whole time), not necessitating of a bidirectional communication, if protection against replay attack can be ensured in advertising mode. For example, this method can be implemented in all of the following technical fields:

automotive (like passenger cars, commercial vehicles, trucks), two-wheelers (like motorbike, bicycle, e-bike, scooter application), three-wheelers (like TucTuc): Tire Pressure Monitoring Sensor (TPMS) advertising over BLE; e-call communicating over BLE with a smartphone; presence detectors (e.g. in baby-seats) communicating over BLE with a smartphone; e-bike sensors and devices communicating over BLE with a receiver.

medical: Communication of portable medical devices such as pacemakers and hearing devices communicating their data to a receiver over Bluetooth.

agriculture: Sensors in fields communicating their data to a gateway over Bluetooth.

industry: Sensors integrated in the production tools communicating their data over Bluetooth to a gateway; Assets tracking;

consumer market: Numerous applications for Bluetooth communication between smartphones, tablets, laptops and wearables, hearables, gaming toys In reference to FIGS. 6 and 7, the sixth and seventh embodiments concern Bluetooth communication methods using Bluetooth Low Energy (BLE) or Bluetooth Classic that ensure a full confidentiality protection of the messages exchanged transmit by the second device to the first device. Indeed these methods include message encryption operations.

Furthermore, unlike the sixth embodiment, the method of the seventh embodiment allows the first and second devices to advertise messages with integrity, authenticity and confidentiality protection. To achieve this, each encrypted message exchanged between these two devices comprises the payload and the calculated tag from the key.

The invention claimed is:

1. A Bluetooth communication method implemented between first and second electronic devices, the method comprising:

establishing a communication in a connected mode between the first and second devices comprising a key exchange operation between these two devices; and establishing a communication in an advertising mode between the first and second devices comprising a periodic broadcast by the second device to the first device of a message comprising a payload and a calculated tag from a key of the key exchange operation, wherein the message comprises a sequence number which is updated for each message broadcasted by the second device to the first device.

2. The method according to claim 1, wherein the sequence number is updated for each message broadcasted by the second device to the first device by incrementing a counter respective to said each message.

3. The method according to claim 2, wherein the sequence number is updated for each message broadcasted by the second device to the first device by, at least when the counter reaches a predetermined end, resetting the counter and changing the key by restarting the key exchange operation between the first and second devices.

4. The method according to claim 1, wherein the calculated tag is obtained by using the key to calculate a Message Authentication Code or to calculate a signature of the payload to be advertised.

5. The method according to claim 1, wherein an integrity check element of this message is a message authentication code.

6. The method according to claim 1, wherein the key is a shared secret key stored in a memory of the first and second devices.

7. A Bluetooth communication method implemented between first and second electronic devices, the method comprising:
   distributing by a third party tool of a key through a secure wired or wireless communication channel to the first and second devices; and
   establishing a communication in an advertising mode between the first and second devices comprising a periodic broadcast by the second device to the first device of a message comprising a payload and a calculated tag from this key,
   wherein the third party tool is a device that is separate from the first device and the second device.

8. The method according to claim 7, wherein the key is a shared secret key stored in a memory of the third party tool.

9. The method according to claim 7, wherein the message comprises a sequence number which is updated for each message broadcasted by the second device to the first device.

10. The method according to claim 9, wherein the sequence number is updated for each message broadcasted by the second device to the first device by incrementing a counter respective to said each message.

11. The method according to claim 10, wherein the sequence number is updated for each message broadcasted by the second device to the first device by, at least when the counter reaches a predetermined end, resetting the counter and changing the key by restarting the key exchange operation between the first and second devices.

12. The method according to claim 7, wherein the calculated tag is obtained by using the key to calculate a Message Authentication Code or to calculate a signature of the payload to be advertised.

13. The method according to claim 7, wherein an integrity check element of this message is a message authentication code.

14. The method according to claim 7, wherein the first device is an Electronic Control Unit (ECU) of a vehicle, the second device is a tire-pressure monitoring system (TPMS) sensor, and the third party tool is a TPMS programming device.

15. A Bluetooth communication system implemented between first and second devices, the system comprising the first and second devices and configured to:
   establish a communication in a connected mode between the first and second devices comprising a key exchange operation between these two devices; and
   establish a communication in an advertising mode between the first and second devices comprising a periodic broadcast by the second device to the first device of a message comprising a payload and a calculated tag from a key of the key exchange operation,
   wherein the message comprises a sequence number which is updated for each message broadcasted by the second device to the first device.

16. A Bluetooth communication system implemented between first and second devices, the system comprising the first and second devices and a third party tool, the system being configured to:
   distribute by the third party tool of a key through a secure wired or wireless communication channel to the first and second devices; and
   establish a communication in an advertising mode between these first and second devices comprising a periodic broadcast by the second device to the first device of a message comprising a payload and a calculated tag from this key,
   wherein the third party tool is a device that is separate from the first device and the second device.

* * * * *